(12) United States Patent
Tang et al.

(10) Patent No.: US 11,008,958 B1
(45) Date of Patent: May 18, 2021

(54) DUAL-FUEL INTEGRATED SWITCH

(71) Applicant: HANGZHOU POWER YOUNG TECHNOLOGY CO.LTD, Hangzhou (CN)

(72) Inventors: Tonny Tang, Hangzhou (CN); Jerry Li, Hangzhou (CN)

(73) Assignee: HANGZHOU POWER YOUNG TECHNOLOGY CO.LTD, Hangzhou (CN)

( * ) Notice: Subject to any disclaimer, the term of this patent is extended or adjusted under 35 U.S.C. 154(b) by 0 days.

(21) Appl. No.: 16/824,728

(22) Filed: Mar. 20, 2020

(30) Foreign Application Priority Data

Dec. 24, 2019 (CN) .......................... 201922352947.X

(51) Int. Cl.
*F02D 19/06* (2006.01)
*F16K 11/083* (2006.01)
*F16K 5/02* (2006.01)

(52) U.S. Cl.
CPC ..... *F02D 19/0676* (2013.01); *F02D 19/0613* (2013.01); *F16K 11/0836* (2013.01); *F16K 5/02* (2013.01)

(58) Field of Classification Search
CPC ............. F02D 19/0676; F02D 19/0613; F16K 11/0836; F16K 5/02
See application file for complete search history.

(56) References Cited

U.S. PATENT DOCUMENTS

2018/0245523 A1\* 8/2018 Tang ........................ F02M 1/02

FOREIGN PATENT DOCUMENTS

CN 206694124 U 12/2017

\* cited by examiner

*Primary Examiner* — Jacob M Amick
*Assistant Examiner* — Charles J Brauch
(74) *Attorney, Agent, or Firm* — Bayramoglu Law Offices LLC

(57) ABSTRACT

A dual-fuel integrated switch includes a bracket. A valve body is provided on one side of the bracket. The inside of the valve body is provided with a spool adapted to the valve body. The spool rotates in the valve body. The first flow passage and the second flow passage communicating with the first flow passage are provided in the spool, an arc-shaped groove is provided on the outer wall of the spool, and the third flow passage adapted to the groove is provided on the side wall of the valve body. The number of the third flow passages is two, and the arc formed by the third flow passage on the side wall of the valve body is the same as the arc at the outer end of the side wall of the groove.

8 Claims, 4 Drawing Sheets

US 11,008,958 B1

DUAL-FUEL INTEGRATED SWITCH

CROSS REFERENCES TO THE RELATED APPLICATIONS

This application is based upon and claims priority to Chinese Patent Application No. 201922352947.X, filed on Dec. 24, 2019, the entire contents of which are incorporated herein by reference.

TECHNICAL FIELD

The present utility model relates to the technical field of control switches, in particular to a dual-fuel integrated switch.

BACKGROUND

At present, small engines powered by gasoline, diesel, natural gas, liquefied gas and the like and electrical equipment driven by them mainly provide temporary power, mobile power and special machinery in the fields such as hospitals, hotels, homes, urban construction, and environmental protection. In recent years, with the increasing popularity of camping and adventure in the wild, small engines also provide temporary power for such activities.

The fuel switching switch, choke switch and flameout switch in the existing dual-fuel engines are generally separately provided. When starting the engine, first select the fuel to be used, then close the choke valve, and manually or electrically start the engine after turning on the fuel switch; after the engine is started, it is necessary to open the choke valve in time to make the engine run stably; when turning off the engine, it is necessary to press the flameout switch and fuel switch. This method is cumbersome and inefficient, and when the user forgets to turn off the fuel switch and the two fuels enter the engine at the same time, there are potential risks such as fuel leakage, engine damage and fire. For example, the Chinese utility model patent (application number: 201720170608.8) discloses a combined control switch for dual-fuel engine, which comprises a knob for controlling the state of the engine; a dial assembly, including a dial and a lever, and the lever is fixedly arranged on the dial; a first rotary member, the lever is in contact with the first rotary member to push the first rotary member to rotate; a second rotary member, the lever is in contact with the second rotary member to push the second rotary member to rotate; a fuel switch and a gas switch; the first rotary member drives the fuel switch to turn on, or the second rotary member drives the gas switch to turn on. The combined control switch described in the said patent has a complicated structure, and the gas switch and the fuel switch are separately provided, which increases the production cost of the product.

SUMMARY

The present utility model aims at the disadvantages of the prior art, such as complicated structure and tedious operation, and provides a dual-fuel switch for generator with a simple structure and convenient operation.

The present utility model solves the above technical problems through the following technical solution:

The dual-fuel integrated switch includes a bracket. A valve body mounted on the bracket is provided on one side of the bracket. The inside of the valve body is provided with a spool adapted to the valve body. The spool rotates in the valve body. The first flow passage and the second flow passage communicating with the first flow passage are provided in the spool, an arc-shaped groove is provided on the outer wall of the spool, and the third flow passage adapted to the groove is provided on the side wall of the valve body.

Preferably, the number of the third flow passages is two, and the arc formed by the third flow passage on the side wall of the valve body is the same as the arc at the outer end of the side wall of the groove, and the inside of the third flow passage is provided with a connector adapted to the third flow passage.

Preferably, the cylindrical diameter of the spool is gradually reduced from the end of the spool near the bracket to the other end of the spool. The first flow passage is radially arranged on the spool, the second flow passage is coaxially provided with the spool, and the end of the first flow passage communicates with the end of the second flow passage.

Preferably, the groove is provided on the outside of the second flow passage, the first flow passage is provided on the side close to the bracket, and both the first flow passage and the groove are provided on the upper half of the spool.

Preferably, the other side of the bracket is provided with a rotary disk connected to the bracket, and the rotary disk is connected to the spool and drives the spool to rotate.

Preferably, three inching switches mounted on the bracket are provided on the side of the bracket near the rotary disk, and a triggering portion adapted to the inching switches is provided on the edge of the side of the rotary disk near the bracket.

Preferably, the rotary disk is provided with a connecting column connected to the spool, the bracket is provided with a sleeve adapted to the connecting column, and the connecting column passes through the sleeve.

Preferably, a limit column is provided on the side of the bracket near the rotary disk. A compression spring and a steel ball provided above the compression spring are provided in the limit column. The steel ball moves up and down in the limit column, the inner wall of the upper end of the limit column is provided with a retaining ring, the cylindrical diameter of the retaining ring is smaller than the cylindrical diameter of the steel ball. A limit section is provided on the side of the rotary disk close to the bracket. A hand feel groove adapted to the steel ball is provided on the limit section, and a limit groove adapted to the limit section is provided on the upper end of the limit column.

The present utility model adopts the above technical solution, and has significant technical effects: The first flow passage, the second flow passage, and the groove are provided in the spool, and the switching between gasoline and the second fuel is achieved through the rotation of the spool, which simplifies the structure, increases the functions of this art, and reduces the production cost.

The names of the parts indicated by the numerals in the figures are as follows: 1—bracket, 2—valve body, 3—spool, 4—the first flow passage, 5—the second flow passage, 6—groove, 7—the third flow passage, 8—connector, 9—hand feel groove, 10—limit groove, 11—steel ball, 12—retaining ring, 13—connecting column, 14—sleeve, 15—limit column, 16—rotary disk, 17—stroke section, 18—inching switch, 19—triggering portion, 20—opening, 181—the first inching switch, 182—the second inching switch, 183—the third inching switch.

DETAILED DESCRIPTION OF THE EMBODIMENTS

The present utility model will be described in further detail below with reference to the appended figures and embodiments.

Embodiment 1

Figure 1:
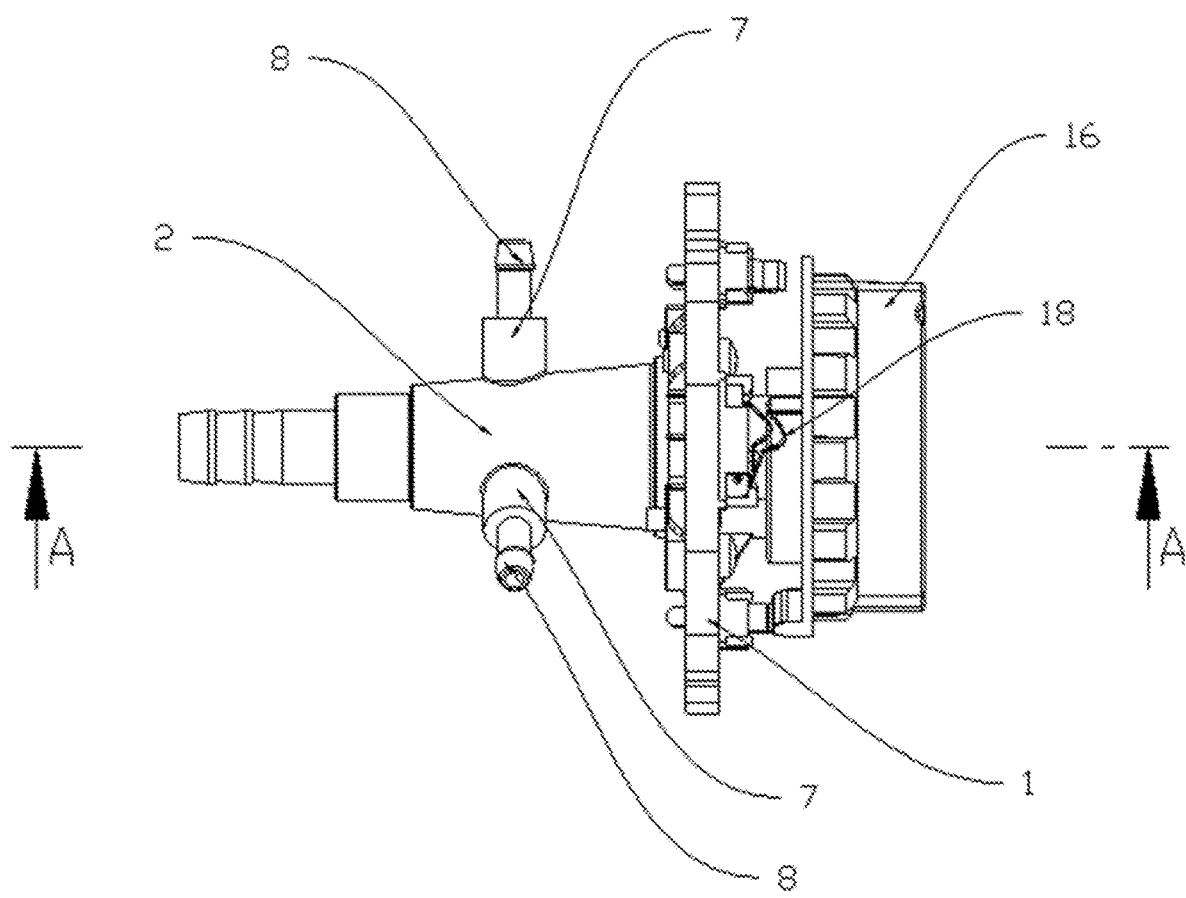
FIG. 1 is a schematic top view of the present utility model.
Figure 2:
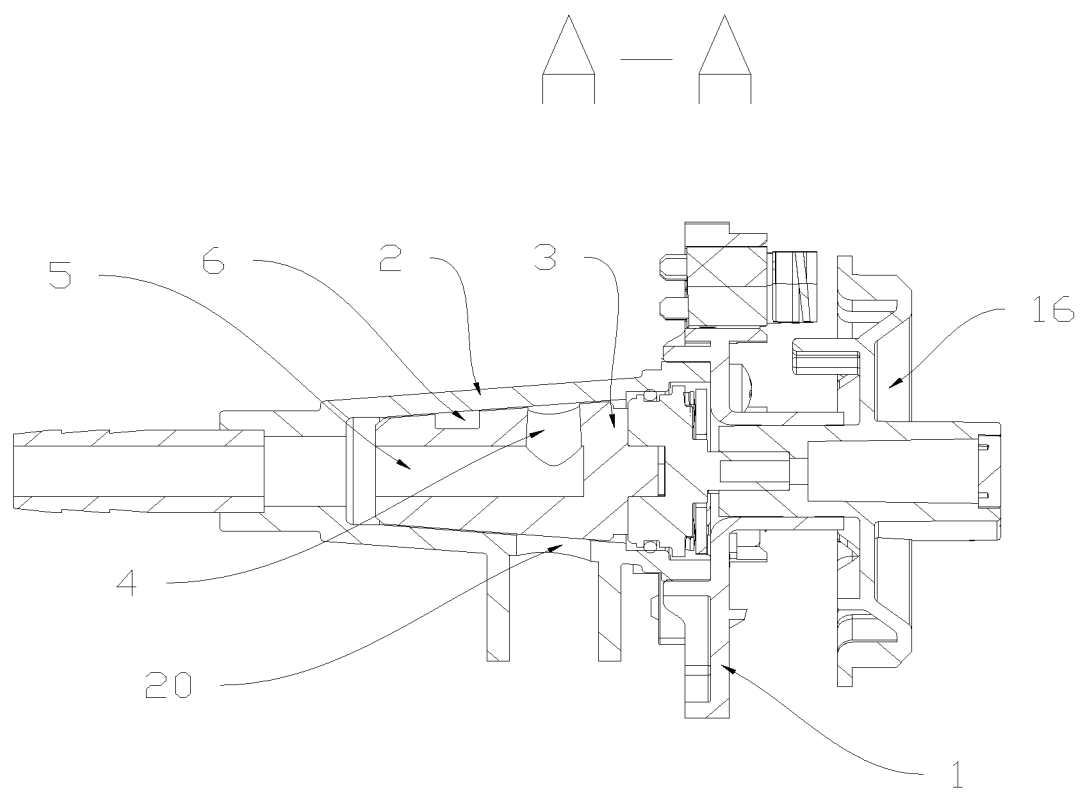
FIG. 2 is a schematic sectional view taken along A-A in FIG. 1.
Figure 3:
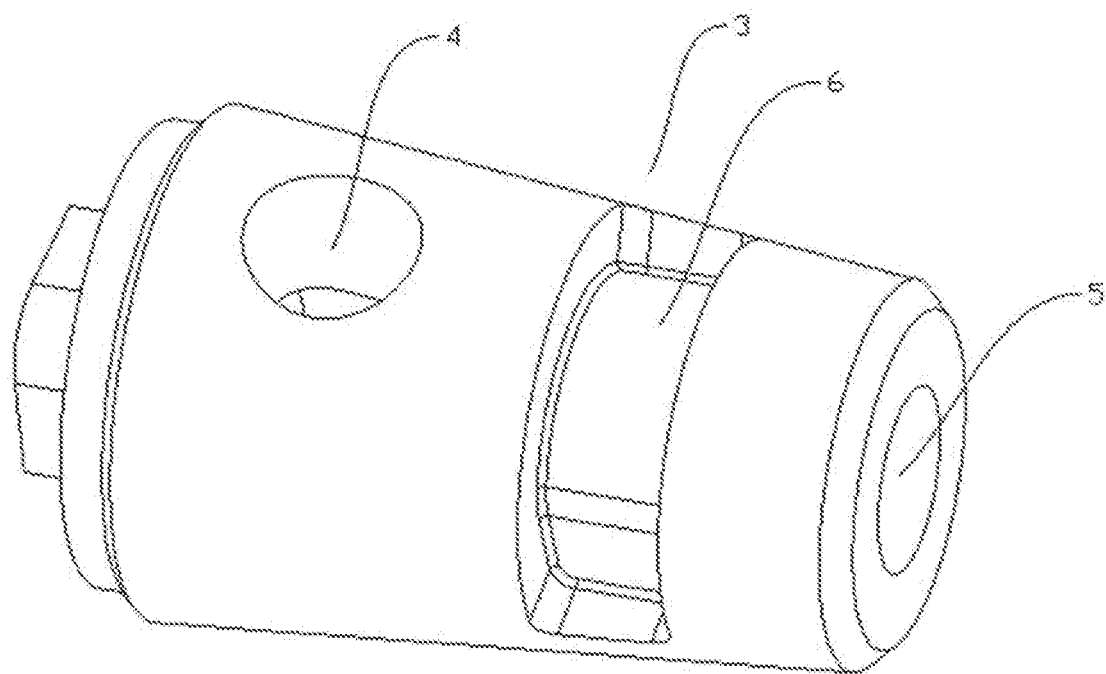
FIG. 3 is a schematic perspective view of the spool.
Figure 4:
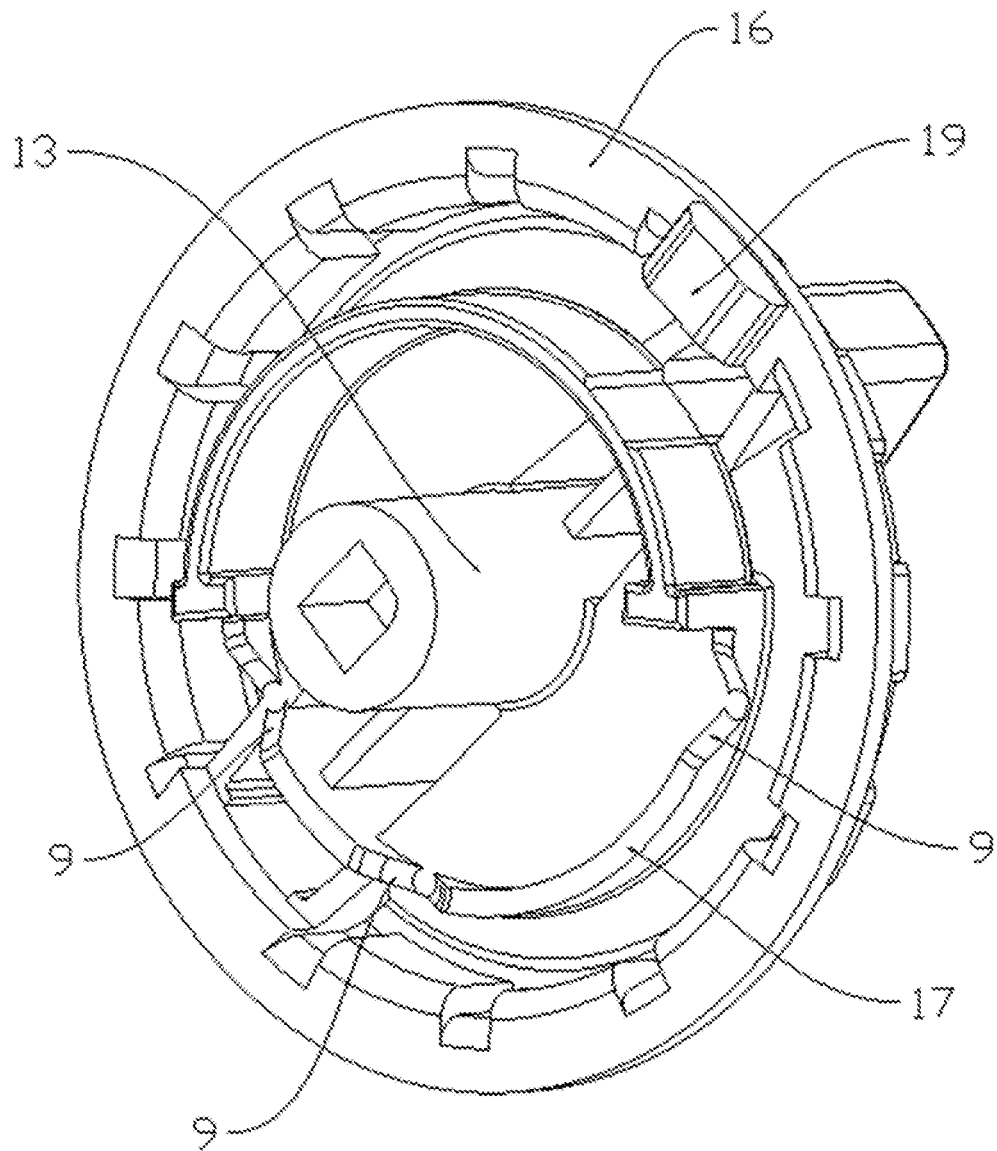
FIG. 4 is a schematic perspective view of the rotary disk.
Figure 5:
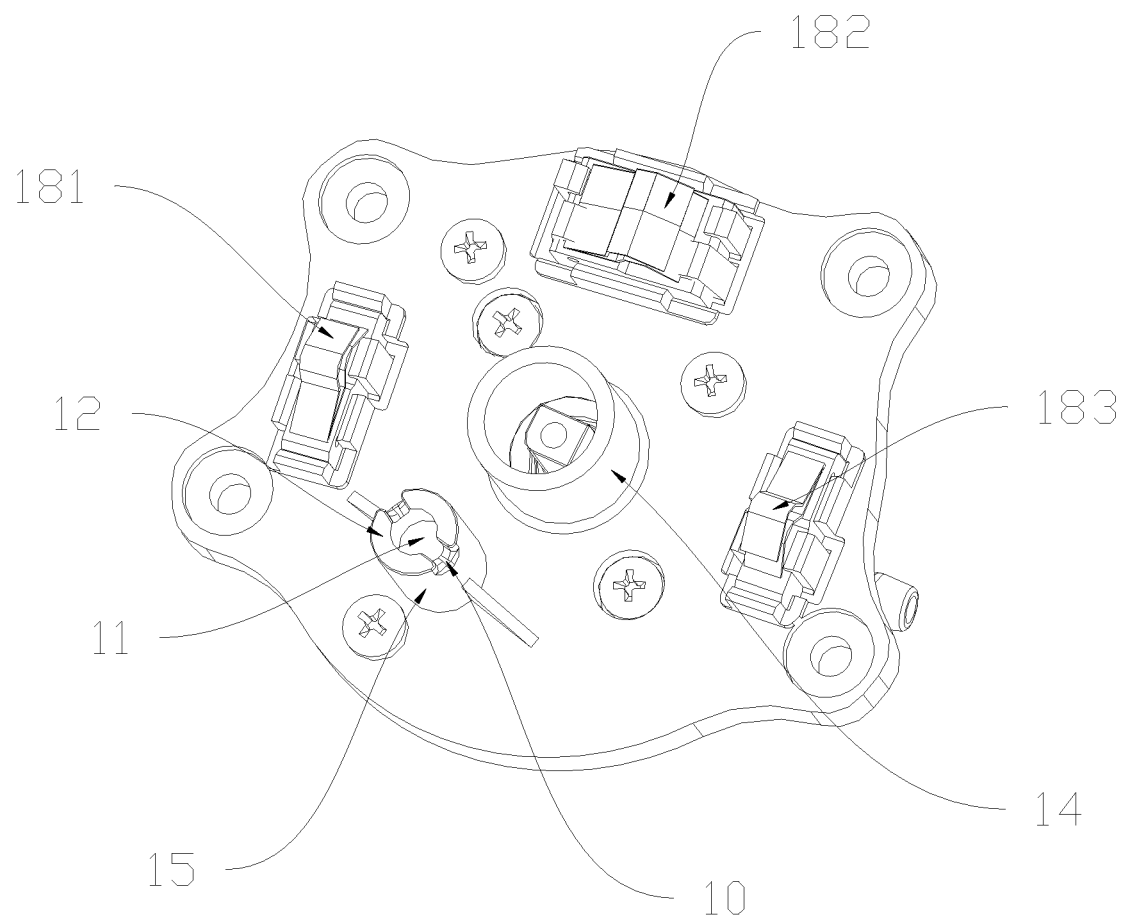
FIG. 5 is a schematic perspective view of the bracket.

The dual-fuel integrated switch, as shown in FIGS. 1-5, includes a bracket 1. A valve body 2 mounted on the bracket 1 is provided on one side of the bracket 1. The inside of the valve body 2 is provided with a spool 3 adapted to the valve body 2. The spool 3 rotates in the valve body 2. The first flow passage 4 and the second flow passage 5 communicating with the first flow passage 4 are provided in the spool 3, an arc-shaped groove 6 is provided on the outer wall of the spool 3, and the third flow passage 7 adapted to the groove 6 is provided on the side wall of the valve body 2. The third flow passage 7 is provided on the upper half of the valve body 2 and on the end of the valve body 2 far from the bracket. The valve body 2 is provided with an outlet 20, and the outlet 20 is provided on the lower half of the valve body 2 and on the end of the valve body 2 close to the bracket 1. When gasoline flows, the spool 3 rotates by a corresponding angle, so that the third flow passage 7 corresponds to the two ends of the groove 6 respectively, and the third flow passage 7 communicates with the groove 6; at this time, the first flow passage 4 is misaligned with the outlet 20 on the valve body 2, the outlet 20 does not communicate with the first flow passage 4, and the gasoline flows in from the third flow passage 7 on one side of the groove 6, flows through the groove 6 and then flows out from the third flow passage 7 on the other side of the groove 6; when the second fuel flows, the spool 3 rotates by a corresponding angle, so that the first flow passage 4 communicates with the outlet 20 on the valve body 2; at this time, the third flow passage 7 is misaligned with the groove 6, so that the third flow passage 7 does not communicate with the groove 6; the first flow passage 4 and the second flow passage 5 are used to circulate the second fuel, the second fuel enters the first flow passage 4 from the outlet 20 on the valve body 2 and flows through the second flow passage 5; the switching between gasoline and the second fuel in the spool 3 is achieved through the rotation of the spool 3, which simplifies the operation, increases the functions of this art, and reduces the production cost.

The number of the third flow passages 7 is two, and the arc formed by the third flow passage 7 on the side wall of the valve body 2 is the same as the arc at the outer end of the side wall of the groove 6, and the inside of the third flow passage 7 is provided with a connector 8 adapted to the third flow passage 7. The third flow passage 7 on the valve body 2 cooperates with the groove 6 on the outer side wall of the spool 3, which facilitates the groove 6 to communicate with the third flow passage 7 when the spool 3 rotates, thus ensuring stable flow of gasoline, reducing the matching precision requirements for the groove 6 and the third flow passage 7, and improving the use safety of the art.

The cylindrical diameter of the spool 3 is gradually reduced from the end of the spool 3 near the bracket 1 to the other end of the spool 3. The first flow passage 4 is radially arranged on the spool 3, the second flow passage 5 is coaxially provided with the spool 3, and the end of the first flow passage 4 communicates with the end of the second flow passage 5. The second fuel flows through the first flow passage 4 and the second flow passage 5 and flows out from the end of the spool 3 far from the bracket 1, which facilitates the circulation of the second fuel, simplifies the structure of the art and facilitates the installation.

The groove 6 is provided on the outside of the second flow passage 5, the first flow passage 4 is provided on the side close to the bracket 1, the spool 3 is divided into an upper half and a lower half based on the horizontal plane where the axle of the spool 3 is located, both the first flow passage 4 and the groove 6 are provided on the upper half of the spool 3, and the first flow passage 4 is provided on the extension line extending in the direction of the first flow passage 4 at both ends of the groove 6. It is convenient to control the first flow passage 4 to circulate the second fuel or the groove 6 to circulate gasoline when the spool 3 rotates at different angles, so as to realize fuel switching.

The other side of the bracket 1 is provided with a rotary disk 16 connected to the bracket 1, and the rotary disk 16 is connected to the spool 3 and drives the spool 3 to rotate. By rotating the rotary disk 16 to drive the spool 3 to rotate, switching between gasoline and the second fuel is achieved, which simplifies the operation of this art.

Embodiment 2

The dual-fuel integrated switch, as shown in FIGS. 1-5, is based on Embodiment 1. Three inching switches 18 mounted on the bracket 1 are provided on the side of the bracket 1 near the rotary disk 16, and a triggering portion 19 adapted to the inching switches 18 is provided on the edge of the side of the rotary disk 16 near the bracket 1. The rotary disk 16 is rotated to control the three operation instructions "Gas", "Stop", and "LPG". "Gas" refers to gasoline, "LPG" refers to the second fuel, and the inching switch 18 is connected to the module. When the rotary disk 16 is rotated, the triggering portion 19 on the rotary disk 16 presses against the corresponding inching switch 18, the inching switch 18 transmits the corresponding operation signal to the module, the module controls the flow of gasoline or the second fuel into the product in this art or stops the inflow of gasoline or the second fuel for shutoff. The inching switch 18 includes the first inching switch 181, the second inching switch 182, and the third inching switch 183. The first inching switch 181 is set under the "Gas" operation instruction. When the rotary disk 16 is rotated to "Gas", that is, the gasoline position, the triggering portion 19 presses against the first inching switch 181, the state of the carburetor is on (the carburetor is off in other positions, and gasoline cannot enter the engine combustion chamber), the pipeline from the gasoline to the engine is open, and the generator can run with the gasoline. The second inching switch 182 is set under the "Stop" operation instruction. When the rotary disk 16 is rotated to the "Stop" position, the triggering portion 19 presses against the second inching switch 182. The second inching switch 182 has two functions, one function is that it grounds the ignition coil to shut off the generator, and the other function is that it turns off the battery to prevent battery power loss (this function is not available if the battery switch is manually started); the third inching switch 183 is set under the "LPG" operation instruction. When the rotary disk 16 is rotated to the "LPG" position, the triggering portion 19 presses against the third inching switch 183, and sends a signal to the display to indicate the fuel-LPG being used on the display. The rotary disk 16 is provided with a connecting column 13 connected to the spool 3, the bracket 1 is provided with a sleeve 14 adapted to the connecting column 13, and the connecting column 13 passes through the sleeve 14. The connecting column 13 is inserted into the sleeve 14 to improve the stability and accuracy of the connecting column 13 during rotation.

Embodiment 3

The dual-fuel integrated switch, as shown in FIGS. 1-5, is based on the second embodiment. A limit column 15 is provided on the side of the bracket 1 near the rotary disk 16. A compression spring and a steel ball 11 provided above the compression spring are provided in the limit column 15. The steel ball 11 moves up and down in the limit column 15, the inner wall of the upper end of the limit column 15 is provided with a retaining ring 12, the cylindrical diameter of the retaining ring 12 is smaller than the cylindrical diameter of the steel ball 11. A stroke section 17 is provided on the side of the rotary disk 16 close to the bracket 1. Three hand feel grooves 9 adapted to the steel ball are provided on the stroke section 17, and a limit groove 10 adapted to the stroke section 17 is provided on the upper end of the limit column 15. The three hand feel grooves 9 correspond to the "Stop", "LPG", and "Gas" button settings. The steel ball 11 moves up and down in the limit column 15 under the action of the compression spring. When the stroke section 17 moves in the limit groove 10, the stroke section 17 presses against the compression spring. When the rotary disk 16 is rotated, it rotates into place when the steel ball 11 is caught in the hand feel groove 9 under the action of the compression spring, which improves the operator's operating accuracy. The stroke section 17 cooperates with the limit column 15 to limit the rotation stroke of the rotary disk 16 to avoid excessive rotation of the rotary disk 16, which reduces the rotation accuracy and affects the operation of the device.

In summary, the above embodiments are only preferred ones of the present utility model. Any equivalent changes and modifications made according to the scope of the present utility model patent shall fall within the scope of the present utility model patent.

What is claimed is:

1. A dual-fuel integrated switch, comprising a bracket, wherein a valve body is provided on a first side of the bracket, an inside of the valve body is provided with a spool adapted to the valve body, the spool rotates in the valve body, a first flow passage and a second flow passage are provided in the spool, the first flow passage communicates with the second flow passage, an arc-shaped groove is provided on an outer wall of the spool, and a plurality of third flow passages adapted to the arc-shaped groove are provided on a side wall of the valve body.

2. The dual-fuel integrated switch according to claim 1, wherein a number of the plurality of third flow passages is two, and an arc formed by each third flow passage of the two third flow passages on the side wall of the valve body is the same as an arc at an outer end of the side wall of the groove, and an inside of the each third flow passage is provided with a connector, the connector is adapted to the each third flow passage.

3. The dual-fuel integrated switch according to claim 1, wherein a cylindrical diameter of the spool is gradually reduced from first end of the spool to second end of the spool, the first end of the spool is closer to the bracket than the second end of the spool the first flow passage is radially arranged on the spool, the second flow passage is coaxially provided with the spool, and an end of the first flow passage communicates with an end of the second flow passage near the bracket.

4. The dual-fuel integrated switch according to claim 1, wherein the groove is provided on an outside of the second flow passage, the first flow passage is provided on a side close to the bracket, and both the first flow passage and the groove are provided on an upper half of the spool.

5. The dual-fuel integrated switch according to claim 1, wherein second side of the bracket is provided with a rotary disk connected to the bracket, and the rotary disk is connected to the spool and drives the spool to rotate.

6. The dual-fuel integrated switch according to claim 5, wherein three inching switches are provided on the second side of the bracket, and a triggering portion adapted to the three inching switches is provided on an edge of a side of the rotary disk near the bracket.

7. The dual-fuel integrated switch according to claim 5, wherein the rotary disk is provided with a connecting column connected to the spool, the bracket is provided with a sleeve adapted to the connecting column, and the connecting column passes through the sleeve.

8. The dual-fuel integrated switch according to claim 5, wherein a limit column is provided on the second side of the bracket, a compression spring and a steel ball provided above the compression spring are provided in the limit column, the steel ball moves up and down in the limit column, an inner wall of an upper end of the limit column is provided with a retaining ring, a cylindrical diameter of the retaining ring is smaller than a cylindrical diameter of the steel ball, a stroke section is provided on a side of the rotary disk close to the bracket, a hand feel groove adapted to the steel ball is provided on the stroke section, and a limit groove adapted to a thickness of the stroke section is provided on the upper end of the limit column.

\* \* \* \* \*